(No Model.)
E. DREDGE.
BAND KNIFE CLOTH CUTTING MACHINE.
No. 280,917. Patented July 10, 1883.
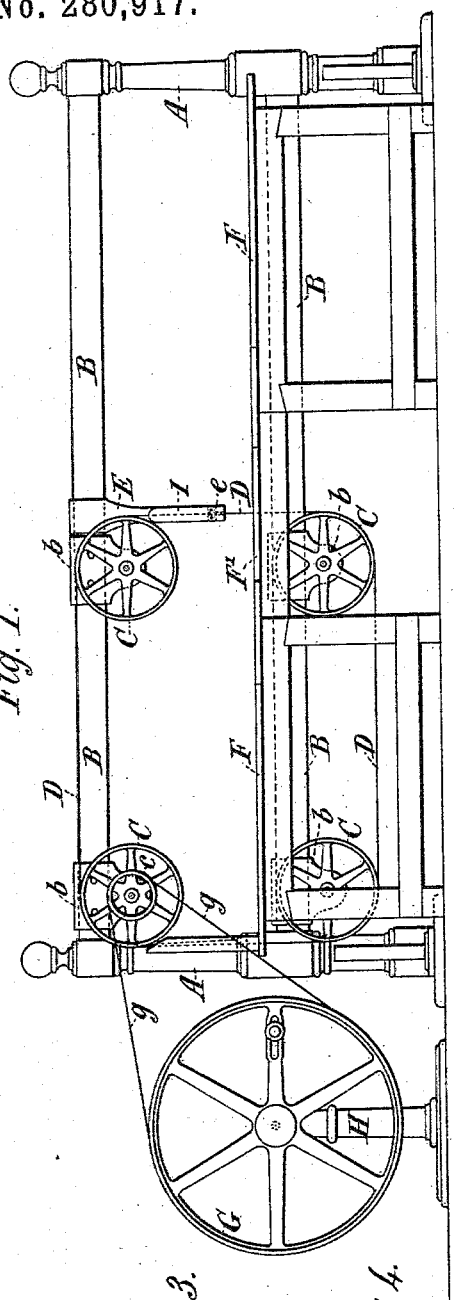
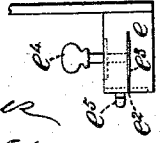
Witnesses:
Inventor:
Edgar Dredge
by his Attorneys
Brown & Brown
N. PETERS, Photo-Lithographer, Washington, D. C.

UNITED STATES PATENT OFFICE.

EDGAR DREDGE, OF HOXTON, COUNTY OF MIDDLESEX, ASSIGNOR OF ONE-HALF TO BEATH, SCHIESS & CO., OF LONDON, ENGLAND.

BAND-KNIFE CLOTH-CUTTING MACHINE.

SPECIFICATION forming part of Letters Patent No. 280,917, dated July 10, 1883.

Application filed December 9, 1882. (No model.) Patented in Victoria, February 22, 1882, No. 3,164.

*To all whom it may concern:*

Be it known that I, EDGAR DREDGE, of Pitfield street, Hoxton, in the county of Middlesex, England, have invented certain Improvements in Band-Knife Cloth-Cutting Machines, of which the following is a specification.

These improvements relate to machines for cutting cloth, leather, and other materials, in which an endless band knife or saw runs over pulleys and passes through a table on which the material to be cut is manipulated, the object of the present invention being to increase the efficiency, simplify the construction, and greatly reduce the cost of such machines. To this end I employ two standards or their equivalent, instead of a single curved arm or standard formed in one with or secured to a bed-plate of considerable weight, as at present in use, and I mount my pulleys upon light rods or cross-bars, preferably horizontal, and of any suitable length, extending between and supported by the said two end standards or their equivalent. I am thus enabled to obtain a practically unlimited breadth of space in which to manipulate the cloth or other substance to be cut, and in addition the cross-bars, which are preferably made of ash or an equivalent strong and springy material, afford sufficient elasticity to greatly obviate the chance of the endless knife or saw breaking when meeting any unusual or sudden obstruction.

In the accompanying drawings, Figure 1 is a front elevation of a machine for cutting cloth and other substances, constructed according to my invention. Fig. 2 is a plan view of the same. Figs. 3 and 4 represent on a larger scale, in side elevation and plan view, respectively, the upper guide for steadying the endless band knife or saw above the work; and Figs. 5 and 6 show, also on a larger scale, in longitudinal section and plan view, respectively, the means for steadying the knife below the work, while preventing any fluff or dirt from impeding the passage of the blade.

In these figures the same letters of reference indicate like or corresponding parts.

A A are the standards supporting the longitudinal flexible bars B at opposite ends thereof.

C C are the band-pulleys, mounted in bracket-bearings b b, adjustable lengthwise on the bars B, so as to give the requisite tension to the endless band D around the pulleys C C, and enable a longer or shorter cutting-band to be rapidly adapted to the machine, the brackets b b being fixed in position, when adjusted, by thumb-screws or their equivalent. Depending from the upper bar B, and exactly opposite the endless band knife or saw D, as it passes downward to cut the cloth or other material, is an adjustable bracket, E, which carries the guide, (shown in detail in Figs. 3 and 4, and to be hereinafter more fully explained.)

F is the table in which the material to be cut is placed. This table is preferably made in two or more sections. (See the plan view, Fig. 2, wherein the table is represented as divided into six separate parts fitting closely together to allow of ready access to the working parts, and the central front part, No. 5, containing the lower guide for the blade, shown in detail in Figs. 5 and 6, and to be presently described.) A portion of the central section, No. 5, of the table F is preferably cut away, as shown at F', to allow the operator to manipulate the cloth or other substance to be cut with greater facility.

G is a hand-wheel mounted in a long bearing, h, on a standard or trestle, H, and a rope or its equivalent, g, connects this wheel G with one of the band-pulleys C, through a grooved pulley, c, cast in one with the pulley C, or keyed on its axle. The endless band knife or saw around the pulleys C C may thus have a rapid motion imparted to it by hand; or the pulleys C C may be driven by a motive-power engine in any convenient manner. It will be seen that by this construction of machine the endless band or saw D can be easily and conveniently arranged to run over four pulleys, as shown in the drawings, and such an arrangement secures the great advantage of never bending the endless band or saw at less than a right angle during its rapid passage around the pulleys C C—a fact which tends greatly to preserve it in a serviceable condition. It will, however, be obvious that by my construction of machine more than four pulleys could be so mounted and arranged as to bend the endless band or saw at an obtuse angle. The band might also, under certain circumstances, be led around three pulleys only; but in this case any increased setting apart of the pulleys would make the angle at which the blade was bent more acute, and hence more liable to break with repeated use.

By using four pulleys for the endless band saw or knife instead of two or three, as ordinarily used, the saw or knife can be extended any distance apart without fear of breaking, as the angle at which it is bent remains unaltered.

The bars B are preferably made of ash or other strong springy material which will yield to a certain extent should the endless band knife or saw D meet with any sudden obstruction.

The pulleys C C may be made with a flange at their back edge to prevent the endless band knife or saw D from slipping off while in use; but I preferably use pulleys with convex peripheries in cross-section, which I find serve to keep the endless band or saw D in place on the pulleys, and render flanged pulleys, grooved pulleys, and anti-friction bowls unnecessary, thus doing away with a vast amount of friction and noise, and increasing the efficiency of the machine.

Referring now to the detail views, Figs. 3 and 4, E is the bracket depending from the upper bar, B, to which is secured the block $e$. This block of wood (or it might be a hollow box, of metal) has a central aperture, $e'$, in front for the passage of the band knife or saw, and two horizontal side cuts, $e^2 e^2$, for the reception of the flat springs $e^3 e^3$, which are held in position when adjusted by the screws $e^4 e^4$. The inner edges of these adjustable flat springs form an elastic guide for the band knife or saw D in its rapid descent, and just before it enters its work, thus preventing the manipulation of the substance or material to be cut from twisting the blade. A guard-plate, I, is attached to the front of the block $e$ by means of the catches $e^5 e^5$, and protects the operator from accidental injury while at work. A somewhat similar arrangement of yielding spring-guide for the blade D is arranged immediately below the band knife or saw as it cuts through the cloth or other material, and as this lower guide would be liable to be choked by fluff or other matter carried down by the blade, I make the said lower guide in the following way:

$ff$ are the yielding springs, forming the lower guide, or that which is adapted to the central section, No. 5, of the table F. These springs are sunk below the level of the top of the table, are slotted to permit of their endwise adjustment, and are secured, when adjusted, by means of the screws $f' f'$ and clamping-blocks $f^2 f^2$. The table F below the springs is cut away, as shown in Fig. 5, to allow of their yielding and bending freely downward when necessary. A plate, $f^2$, with a central slot, $f^3$, covers over the springs and lies flush with the table F, being secured to the table in any convenient manner, or merely resting on a part of the table F, as shown.

Should any fluff or other substance be carried down by the endless band knife or saw D through the slotted plate $f^2$, the springs $ff$ on either side of the blade will yield and prevent a breakage from clogging, while tending to strip the waste stuff off the blade before its next round. As an alternative arrangement the horizontal or other cross-bars B, which support the adjustable pulleys carrying the endless cutting band saw or knife, may be carried by brackets pendent from the roof or springing from the walls of the room or workshop, or it may be one end of such cross-bar may be supported in a standard secured to the floor in any convenient manner, and the other end may be carried by a bracket from the wall or ceiling, as may be desirable.

I do not limit myself to two standards or to their precise position, so long as the cross-bars B carrying the pulleys are supported at each end, so as to allow of any desired breadth of space for working the material to be cut around the blade D.

In some cases the four pulleys may be carried by horizontal rods or bars projecting from a standard or standards at one end thereof, the said rods being steadied by stays or rods connecting them to the said standard or standards; but the first-described form of frame is preferred.

I am aware that it is not new to mount an endless band knife or saw upon four pulleys, so as to separate by a considerable distance the ascending and descending portions of the knife or saw. In such a machine the two upper pulleys have been carried by a frame fulcrumed at one end, and having a weight connected with its other end, so as to pull it upward and keep a proper amount of tension upon the knife or saw. In the machine referred to the upper pulleys are supported in bearings on the aforesaid frame, which are universally adjustable, so as to provide for both the vertical and lateral adjustment of the pulleys.

I do not claim any of the above-described features of construction as included in my invention.

Having now set forth the nature of my invention of "improvements in apparatus for cutting cloth, leather, rubber, and other materials," and explained the manner of carrying the same into practical effect, I wish it to be understood that I claim—

1. In an endless band knife or saw cutting-machine, the combination of the standards A A, supporting at opposite ends the horizontal springy rods or bars B B, brackets $b\ b$, adjustable along said rods or bars between said standards, pulleys C C, carried by said brackets, and the endless band knife or saw D, substantially as and for the purpose set forth.

2. In an endless band knife or saw cutting-machine, the combination, with the standards A A, horizontal springy rods or bars B B, supported at opposite ends by said standards, brackets $b\,b$, mounted on and adjustable lengthwise along said rods or bars B B, and pulleys C C, carried by said brackets, of the endless band knife or saw D and guides for steadying the said knife or saw and preventing twisting thereof, substantially as described.

3. In an endless band knife or saw cutting-machine, the standards A A, supporting the horizontal springy rods or bars B B, pulleys C C, carried in bracket-bearings $b\,b$, adjustable on the rods or bars B B, for the purpose set forth, upper and lower spring-guides, and table F, formed in two or more sections, substantially as shown and described.

4. In combination with an endless band knife or saw, D, working over convex or other pulleys C C, which are carried in bracket-bearings $b\,b$, adjustable on the horizontal bars B B, of any desired length, and suitably supported at each end, the upper adjustable spring-guide carried by a bracket, E, pendent from the upper bar B, and lower adjustable spring-guide adapted to the table F, substantially as and for the purpose set forth.

5. The combination, with the endless band knife or saw D and pulleys for supporting the same, of the upper guide, consisting of the block $e$, slotted vertically for the passage of the knife or saw, and slotted horizontally, and springs $e^3\,e^3$, which are adjustably secured in said horizontal slots, and between the adjacent ends of which the knife or saw passes, the springs being capable of yielding in a downward direction by contact of the knife or saw with their ends, and thus forming an elastic or spring guide, substantially as described.

6. The combination, with the endless band knife or saw, supporting-pulleys therefor, and a cutting-table, of the lower guide consisting of the springs $f\,f$, between which said knife or saw passes, and the slotted covering-plate $f^2$, substantially as described.

EDGAR DREDGE.

Witnesses:
H. K. WHITE,
GEO. CANTLE,
   *Both of 66 Chancery Lane, London.*